(12) United States Patent
Tachibana et al.

(10) Patent No.: US 6,688,005 B1
(45) Date of Patent: Feb. 10, 2004

(54) PLUNGER HOLDING DEVICE FOR SABER SAW

(75) Inventors: Toshihiko Tachibana, Hitachi (JP); Yoshio Osada, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/549,338

(22) Filed: Apr. 14, 2000

(30) Foreign Application Priority Data

Aug. 11, 1999 (JP) .......................................... 11-227256

(51) Int. Cl.$^7$ .............................................. B23D 49/16
(52) U.S. Cl. .......................................... 30/392; 30/393
(58) Field of Search .......................... 30/392–394, 210, 30/216, 217, 219, 220, 182, 187, 277.4; 83/647, 646

(56) References Cited

U.S. PATENT DOCUMENTS

| | | | | |
|---|---|---|---|---|
| 2,631,619 A | * | 3/1953 | Folli | 30/392 |
| 2,775,272 A | * | 12/1956 | Papworth | 30/392 |
| 3,033,252 A | * | 5/1962 | Atkinson | 30/393 |
| 3,640,280 A | * | 2/1972 | Slanker et al. | 128/317 |
| 4,550,501 A | * | 11/1985 | Moores, Jr. et al. | 30/393 |
| 4,864,727 A | * | 9/1989 | Chu | 173/171 |
| 4,962,588 A | * | 10/1990 | Fushiya et al. | 30/372 |
| 5,212,887 A | * | 5/1993 | Farmerie | 30/393 |
| 5,450,925 A | * | 9/1995 | Smith et al. | 184/5 |
| 5,615,746 A | * | 4/1997 | Chu | 30/272.1 |
| 5,782,000 A | * | 7/1998 | Bednar | 30/393 |
| 5,819,421 A | * | 10/1998 | Giacometti et al. | 30/392 |
| 6,006,435 A | * | 12/1999 | Chien | 30/392 |
| 6,065,216 A | * | 5/2000 | Izumisawa | 30/392 |
| 6,173,500 B1 | * | 1/2001 | Feldmann | 30/392 |
| 6,212,781 B1 | * | 4/2001 | Marinkovich et al. | 30/394 |
| 6,226,877 B1 | * | 5/2001 | Ono | 30/392 |
| 6,249,979 B1 | * | 6/2001 | Bednar et al. | 30/392 |
| 6,282,797 B1 | * | 9/2001 | Osada et al. | 30/392 |

* cited by examiner

Primary Examiner—Kenneth E. Peterson
Assistant Examiner—Omar Flores-Sánchez
(74) Attorney, Agent, or Firm—Louis Woo

(57) ABSTRACT

A saber saw includes a housing, a plunger supported within the housing and being free to reciprocate, and a swingable guide sleeve provided within the housing and connected with the plunger for imparting a swinging motion to the plunger. In the saber saw, a plunger holding device includes a cylindrical resilient member provided between the guide sleeve and the housing. The resilient member is in fluid-tight contact with the housing.

2 Claims, 5 Drawing Sheets

PLUNGER HOLDING DEVICE FOR SABER SAW

BACKGROUND OF THE INVENTION

1. Field of the Invention

This invention generally relates to a saber saw. This invention particularly relates to a plunger holding device in a saber saw.

2. Description of the Related Art

Saber saws are basically of first and second types. In a saber saw of the first type, a blade is reciprocated along a linear path. In a saber saw of the second type, a blade is moved along an orbital path, for example, an elliptical path. The second type is also referred to as the orbital cutting type.

In a typical saber saw of the orbital cutting type, a plunger on which a blade is mounted slidably extends into a guide sleeve. The plunger is reciprocated along the guide sleeve. A suitable mechanism periodically swings the guide sleeve in synchronism with the reciprocation of the plunger. The plunger swings as the guide sleeve swings. The reciprocation and the swing cause the plunger and the blade to move along an orbital path or an elliptical path. The guide sleeve repetitively collides against a gear cover while periodically swinging. Thus, the typical saber saw of the orbital cutting type is noisy during its operation. In the typical saber saw of the orbital cutting type, the guide sleeve and the gear cover tend to wear away.

SUMMARY OF THE INVENTION

It is an object of this invention to provide a long-life silent saber saw.

A first aspect of this invention provides a plunger holding device in a saber saw including a housing, a plunger supported within the housing and being free to reciprocate, and a swingable guide sleeve provided within the housing and connected with the plunger for imparting a swinging motion to the plunger. The plunger holding device comprises a cylindrical resilient member provided between the guide sleeve and the housing, the resilient member being in fluid-tight contact with the housing.

A second aspect of this invention is based on the first aspect thereof, and provides a plunger holding device wherein the resilient member is made of rubber.

A third aspect of this invention is based on the first aspect thereof, and provides a plunger holding device wherein the resilient member has an inward projection in fluid-tight contact with the guide sleeve.

A fourth aspect of this invention is based on the first aspect thereof, and provides a plunger holding device wherein an end of the resilient member has bottom walls with an opening through which the plunger extends, the bottom walls being in fluid-tight contact with the plunger.

A fifth aspect of this invention is based on the first aspect thereof, and provides a plunger holding device further comprising a dustproof member provided between the plunger and a flange of the resilient member, and an O-ring provided on the flange for forcing the flange inward and thereby pressing the dustproof member against the plunger.

A sixth aspect of this invention provides a saber saw comprising a housing; a plunger supported within the housing and being free to reciprocate; a swingable guide sleeve provided within the housing and connected with the plunger for allowing swing of the plunger; and a resilient member provided between the guide sleeve and the housing to prevent the guide sleeve from directly colliding against the housing.

A seventh aspect of this invention is based on the sixth aspect thereof, and provides a saber saw wherein the resilient member is in fluid-tight contact with the guide sleeve and the housing.

DESCRIPTION OF THE PREFERRED EMBODIMENTS

A prior-art saber saw of the orbital cutting type will be explained hereinafter for a better understanding of this invention.

Figure 1:
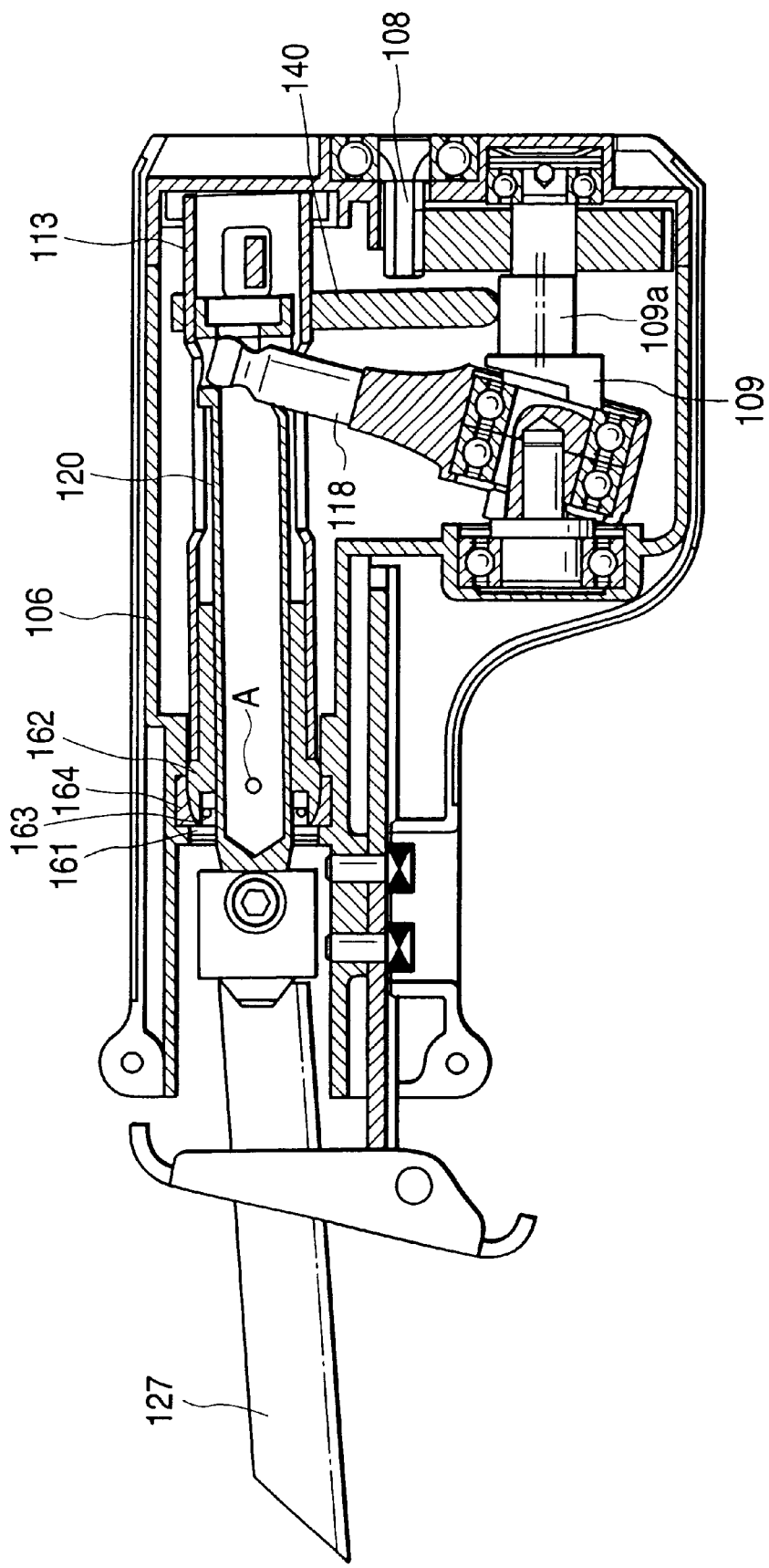
FIG. 1 is a sectional view of a portion of a prior-art saber saw.

FIG. 1 shows a prior-art saber saw of the orbital cutting type. The prior-art saber saw in FIG. 1 includes a driving gear 108 for rotating a second shaft 109. The second shaft 109 has an eccentric portion 109a. A reciprocating plate 118 for converting rotational motion into reciprocating motion is connected to the second shaft 109.

In the prior-art saber saw of FIG. 1, a plunger 120 couples with the reciprocating plate 118. A blade 127 is attached to a front end of the plunger 120. The plunger 120 is slidably connected to a guide sleeve 113. The plunger 120 coaxially extends into the guide sleeve 113. The guide sleeve 113 is connected to a gear cover 106. The guide sleeve 113 can swing relative to the gear cover 106 about a radially-extending pin "A". As the second shaft 109 rotates, the reciprocating plate 118 periodically wobbles so that the plunger 120 reciprocates along axial directions (horizontal directions).

In the prior-art saber saw of FIG. 1, a connection plate 140 is connected to a rear portion of the guide sleeve 113. The connection plate 140 extends downward from the guide sleeve 113. A lower end of the connection plate 140 contacts the eccentric portion 109a of the second shaft 109. During operation of the saber saw, a reaction force applied to the blade 127 from a workpiece swings the guide sleeve 113 in the clockwise direction about the pin "A" so that the lower end of the connection plate 140 is moved downward and pressed against the eccentric portion 109a of the second shaft 109. As the second shaft 109 rotates, the eccentric portion 109a thereof rotates. The connection plate 140 periodically moves up and down in accordance with rotation of the eccentric portion 109a of the second shaft 109. The guide sleeve 113 periodically swings about the pin "A" as the connection plate 140 periodically moves up and down. The plunger 120 moves in accordance with swing of the guide sleeve 113. Therefore, as the second shaft 109 rotates, the plunger 120 periodically swings in a vertical plane.

In the prior-art saber saw of FIG. 1, the blade 127 moves together with the plunger 120. During operation of the saber saw, the plunger 120 reciprocates in the horizontal directions while periodically swings in a vertical plane. Thus, the saw blade 127 moves along an elliptical path (an elliptical trajectory). The elliptical path is determined by the phase angle of the eccentric portion 109a of the second shaft 109 relative to the plunger 120.

In the prior-art saber saw of FIG. 1, the guide sleeve 113 repetitively collides against the inner surfaces of the gear cover 106 while periodically swinging. Thus, the prior-art saber saw of FIG. 1 is noisy during its operation. The guide sleeve 113 and the gear cover 106 tend to wear away.

In the prior-art saber saw of FIG. 1, a felt ring 161 extending in front of the guide sleeve 113 is provided between the gear cover 106 and the plunger 120 for sealing purposes. In addition, a cylindrical bearing metal 162 located between the guide sleeve 113 and the plunger 120 has a front end formed with a recess in which an oil seal 163 is disposed. The bearing metal 162 is held by a ring member 164. The sealing provided by the felt ring 161 tends to be insufficient.

FIRST EMBODIMENT

Figure 2:
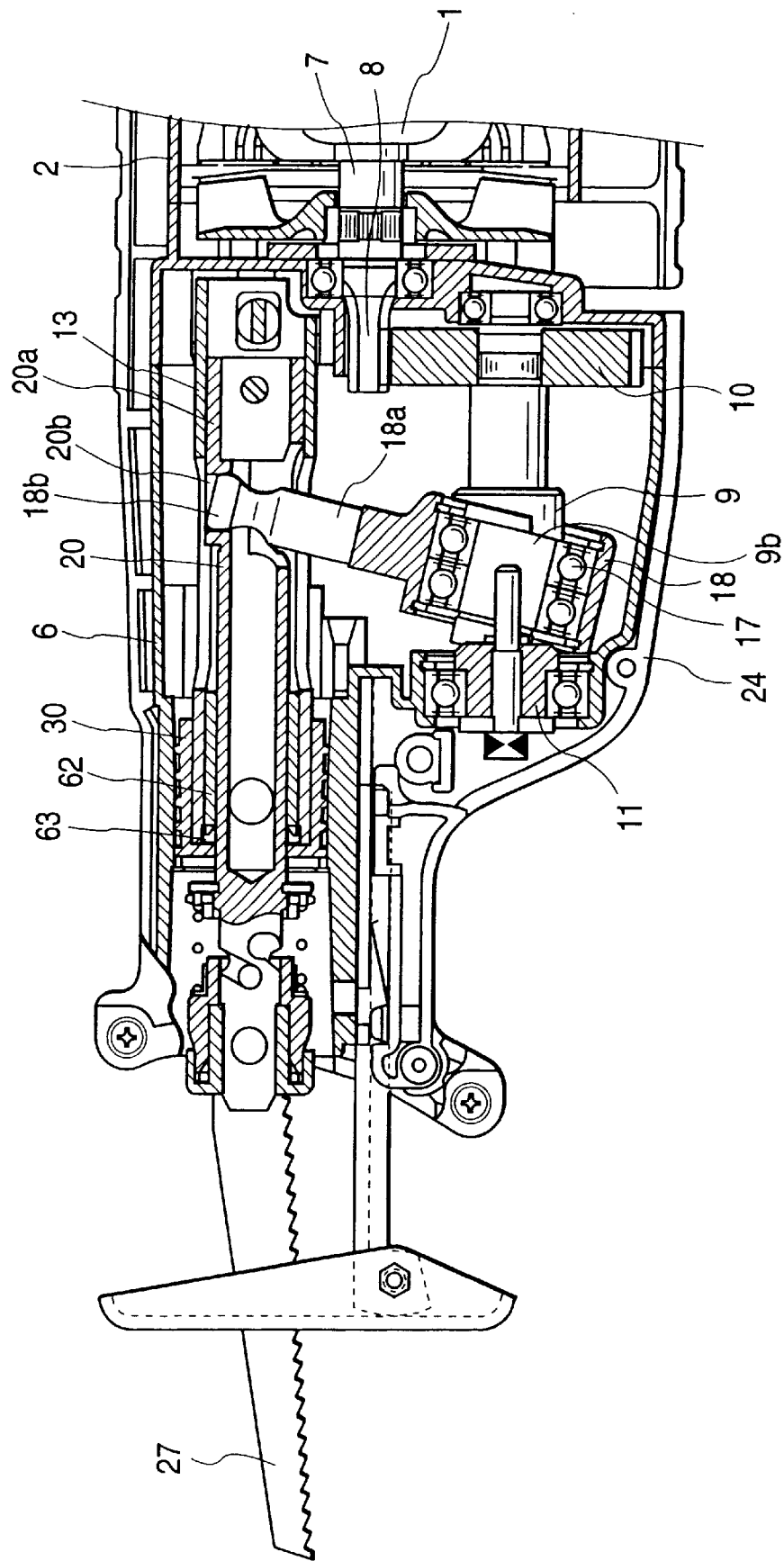
FIG. 2 is a sectional view of a portion of a saber saw according to a first embodiment of this invention.
Figure 3:
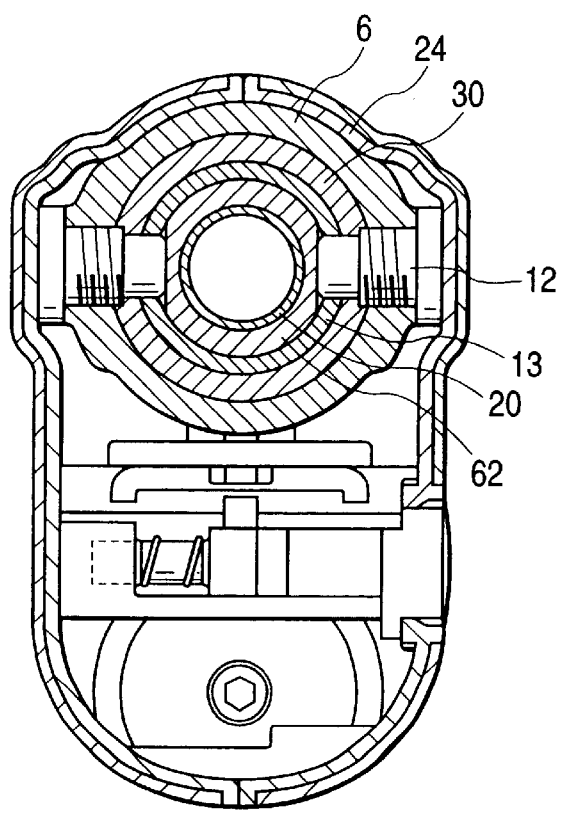
FIG. 3 is a sectional view of the saber saw in FIG. 2.

With reference to FIGS. 2 and 3, a saber saw of a first embodiment of this invention includes an electric motor 1 disposed in a motor housing 2 to which a handle (not shown) is connected.

A gear cover 6 made of aluminum is connected to a front end of the motor housing 2. A power transmission mechanism, which will be mentioned later, is contained in the gear cover 6. The electric motor 1 has an output shaft 7 whose end is formed with a driving gear 8. A second shaft 9 extends in parallel with the motor shaft 7. A driven gear 10 is mounted on the second shaft 9. The driven gear 10 meshes with the driving gear 8. A rotational force generated by the electric motor 1 is transmitted from the motor shaft 7 to the second shaft 9 via the driving gear 8 and the driven gear 10. Thus, the second shaft 9 is rotated by the electric motor 1. A front portion of the second shaft 9 is formed with an inclined shaft 9b. A sub shaft 11 is connected to a front end of the inclined shaft 9b. The sub shaft 11 is coaxial with the driven gear 10.

The motor housing 2 and the gear cover 6 form a housing of the saber saw. A front cover 24 made of resin extends outward of the gear cover 6. As shown in FIG. 3, the front cover 24 is of a two-layer structure. It should be noted that FIG. 2 shows the front cover 24 as a single-layer member for simplicity of illustration.

As best shown in FIG. 3, two bolts 12 are connected to a front portion of the gear cover 6. The gearr cover 6 is approximately cylindrical. The bolts 12 radially extend through the walls of the gear cover 6. The bolts 12 engage the walls of the gear cover 6. The bolts 12 are diametrically opposite to each other. Thus, the bolts 12 have a common axis. A guide sleeve 13 extends in the gear cover 6. The guide sleeve 13 is connected with the tips of the bolts 12. The guide sleeve 13 can swing about the axis of the bolts 12. The axis of the bolts 12 extends horizontally with respect to the body of the saber saw, so that the guide sleeve 13 can swing in a vertical plane.

As shown in FIG. 2, a reciprocating plate 18 is connected to the inclined shaft 9b on the second shaft 9 via two bearings 17. The reciprocating plate 18 has a wobble shaft 18a. A tip of the wobble shaft 18a is formed with a ball 18b. A cylindrical bearing metal 62 is coaxially fitted in a front portion of the guide sleeve 13. A plunger 20 extends through the bearing metal 62. The plunger 20 is slidably supported via the bearing metal 62. The plunger 20 coaxially and slidably extends into the guide sleeve 13. Thus, the plunger 20 is supported by the guide sleeve 13. The plunger 20 can reciprocate along its axis relative to the guide sleeve 13. The plunger 20 has an axially-extending bore. A rear part of the plunger 20 has a large-diameter portion 20a which slidably and coaxially extends in the guide sleeve 13. The plunger 20 can slide axially while being guided by the guide sleeve 13. The plunger 20 can swing together with the guide sleeve 13 about the axis of the bolts 12. The upper walls of the large-diameter portion 20a of the plunger 20 have a radial hole 20b. The wobble shaft 18a of the reciprocating plate 18 extends through an axially-extending elongate hole in the lower walls of the guide sleeve 13 and also through a hole in the lower walls of the plunger 20. The ball 18b on the tip of the wobble shaft 18a slidably fits in the radial hole 20b. Thus, the wobble shaft 18a engages the plunger 20 via the ball 18b. The inclined shaft 9b, the reciprocating plate 18, the wobble shaft 18a, the ball 18b, and the engagement between the ball 18b and the plunger 20 compose a mechanism for converting rotation of the second shaft 9 into reciprocation of the plunger 20 along its axis.

There is provided a conventional attachment device for detachably fixing a blade 27 to a front end of the plunger 20. In addition, there is provided a conventional mechanism for periodically swinging the plunger 20 about the pins 12 as the plunger 20 reciprocates axially. The swing of the plunger 20 and the axial reciprocation thereof are synchronized so that the plunger 20 and the blade 27 will move along an orbital path or an elliptical path.

The swinging mechanism includes the guide sleeve 13 and the bolts 12. The swinging mechanism further includes fixed guide rails, and rollers mounted on the plunger 20. The guide rails have inclined surfaces with which the rollers contact. As the plunger 20 reciprocates axially, the rollers slide on the inclined surfaces of the guide rails and thereby force the plunger 20 and the guide sleeve 13 to periodically swing.

It should be noted that the swinging mechanism may alternatively be of the structure used in the prior-art saber saw of FIG. 1.

As previously mentioned, a cylindrical bearing metal 62 is coaxially disposed in a front portion of the guide sleeve 13. The bearing metal 62 coaxially extends around the plunger 20. The bearing metal 62 supports the plunger 20 in a manner such as to allow axial reciprocation of the plunger 20. An annular oil seal 63 is provided in front of the bearing metal 62. A cylindrical resilient member 30 is coaxially provided between the gear cover 6 and the front portion of the guide sleeve 13. The resilient member 30 fits around the front portion of the guide sleeve 13. Thus, the resilient member 30 is mounted on the front portion of the guide sleeve 13. A front end of the resilient member 30 has radial walls or bottom walls with a central opening through which the plunger 20 extends. The resilient member 30 is made of suitable elastic material such as rubber.

Figure 4:
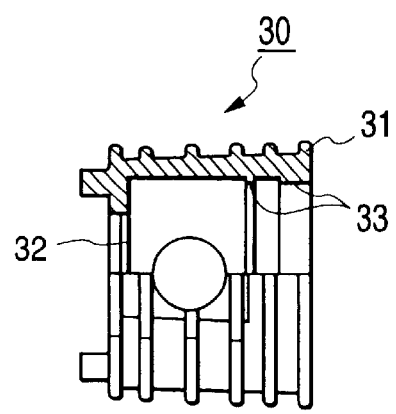
FIG. 4 is a side view, partially in section, of a resilient member in FIGS. 2 and 3.
Figure 5:
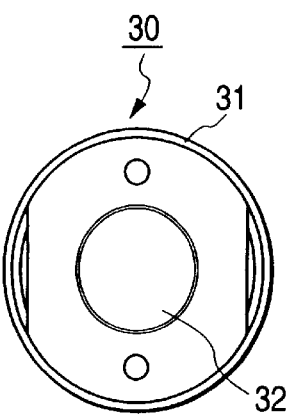
FIG. 5 is a front view of the resilient member in FIG. 4.

As best shown in FIGS. 4 and 5, the circumferential outer surfaces of the resilient member 30 have radial projections 31 in the form of circumferentially-extending rings. The projections 31 are spaced at intervals in the axial direction of the resilient member 30. The projections 31 contact the inner surfaces of the gear cover 6. The projections 31 provide reliable fluid-tight (airtight and watertight) contact between the resilient member 30 and the gear cover 6.

Figure 6:
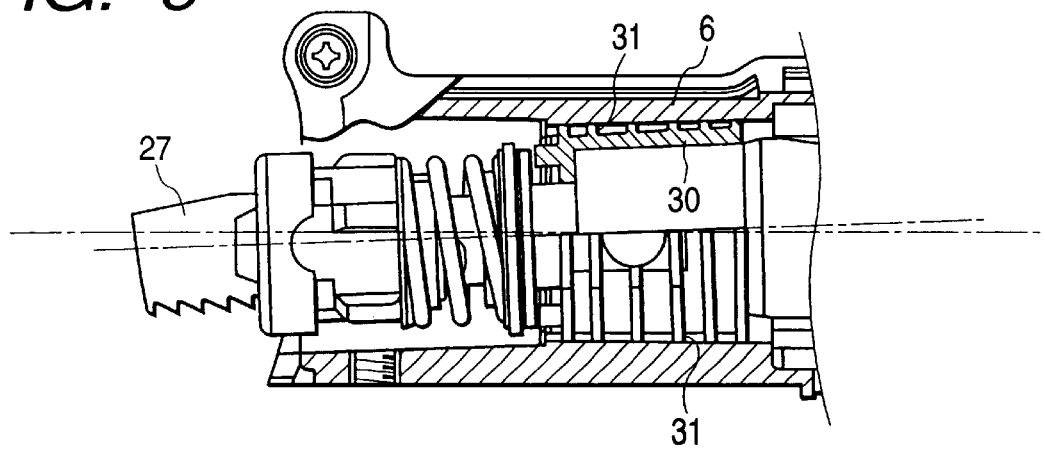
FIGS. 6 and 7 are sectional views of a portion of the saber saw in FIG. 2.
Figure 7:
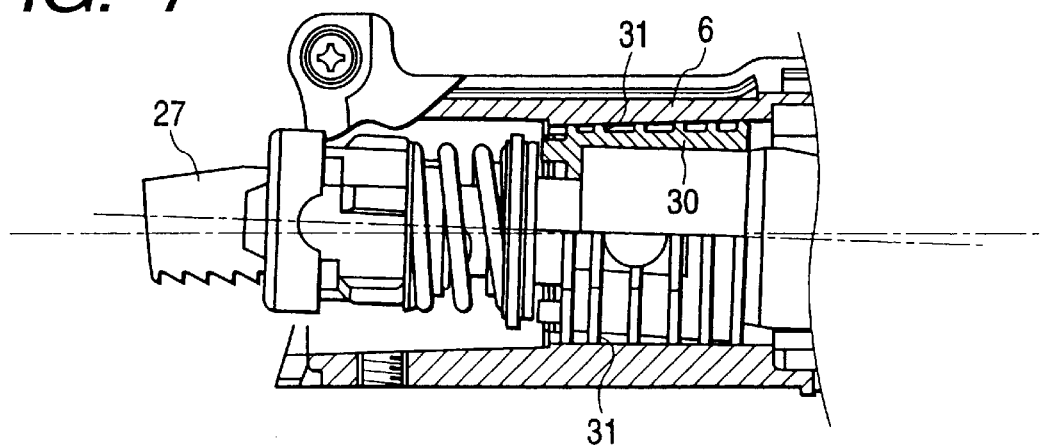

Since the resilient member 30 is mounted on the gear sleeve 13, the resilient member 30 moves together therewith. The projections 31 deform and remain in contact with the inner surfaces of the gear cover 6 as the resilient member 30 swings together with the guide sleeve 13 and the plunger 20. As shown in FIG. 6, even in the case where the plunger 20 and the guide sleeve 13 are displaced counterclockwise from their neutral positions (their horizontal positions), the projections 31 deform and remain in contact with the inner surfaces of the gear cover 6. As shown in FIG. 7, even in the case where the plunger 20 and the guide sleeve 13 are displaced clockwise from their neutral positions, the projections 31 deform and remain in contact with the inner surfaces of the gear cover 6. In this way, the fluid-tight (airtight and watertight) contact between the resilient member 30 and the gear cover 6 is maintained during the swing of the plunger 20 and the guide sleeve 13. The fluid-tight contact between the resilient member 30 and the gear cover 6 prevents water and cutting powder from entering an interior of the saber saw.

As shown in FIGS. 4 and 5, the radial walls (the bottom walls) of the front end of the resilient member 30 have a central opening 32 through which the plunger 20 extends. The radial walls reach the outer surfaces of the plunger 20. Specifically, the radial walls fluid-tightly (airtightly and watertightly) contact the plunger 20, thereby preventing water and cutting powder from entering the interior of the saber saw.

As best shown in FIG. 4, the circumferential inner surfaces of the resilient member 30 have radial projections 33 in the form of circumferentially-extending rings. The projections 33 are spaced at an interval in the axial direction of the resilient member 30. The projections 33 contact the outer surfaces of the guide sleeve 13. The projections 33 provide reliable fluid-tight (airtight and watertight) contact between the resilient member 30 and the guide sleeve 13. The fluid-tight contact between the resilient member 30 and the guide sleeve 13 prevents water and cutting powder from entering the interior of the saber saw.

The resilient member 30 covers the front portion of the guide sleeve 13. The resilient member 30 prevents the guide sleeve 13 from directly colliding against the gear cover 6 during the swing of the guide sleeve 13. Therefore, the saber saw is silent during its operation. In addition, the guide sleeve 13 and the gear cover 6 hardly wear away. Thus, the saber saw has a long life.

SECOND EMBODIMENT

Figure 8:
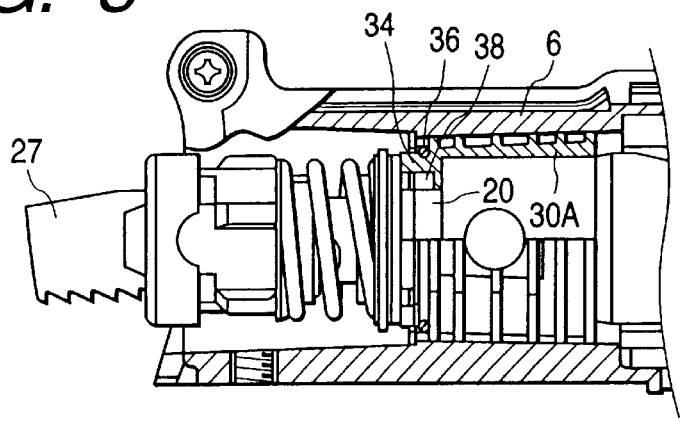
FIG. 8 is a sectional view of a portion of a saber saw according to a second embodiment of this invention.
Figure 9:
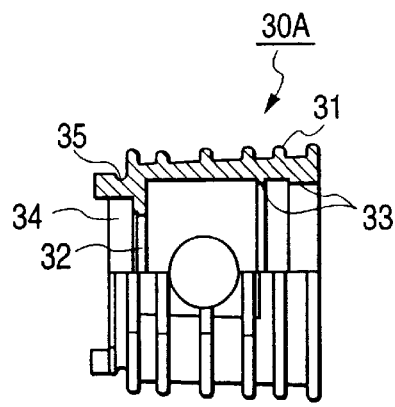
FIG. 9 is a side view, partially in section, of a resilient member in FIG. 8.
Figure 10:
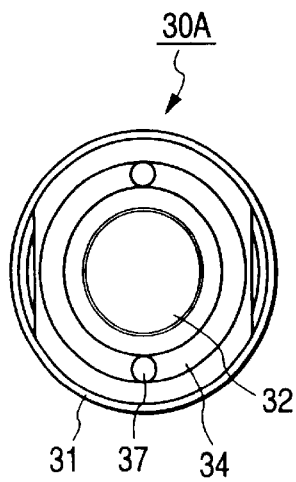
FIG. 10 is a front view of the resilient member in FIG. 9.

FIGS. 8, 9, and 10 show portions of a saber saw according to a second embodiment of this invention. The second embodiment of this invention is similar to the first embodiment thereof except for design changes mentioned hereinafter. The saber saw in the second embodiment of this invention includes a resilient member 30A instead of the resilient member 30 (see FIGS. 2–7).

As shown in FIGS. 8–10, a front end of the resilient member 30A has an annular flange 34 extending frontward from bottom walls thereof. The flange 34 is radially spaced from a plunger 20. A felt ring 38 is provided between the plunger 20 and the flange 34. The outer circumferential surfaces of the flange 34 have an annular groove 35 into which an O-ring 36 fits. The O-ring 36 forces the flange 34 radially inward, thereby pressing the felt ring 38 against the outer surfaces of the plunger 20. Accordingly, the felt ring 38 provides a dustproof effect. The felt ring 38 can be in fluid-tight (airtight and watertight) contact with the outer surfaces of the plunger 20. In this case, water and cutting powder are prevented from entering an interior of the saber saw. The flange 34 has frontward projections 37.

What is claimed is:

1. In a saber saw including a housing, a plunger supported within the housing and being free to reciprocate. and a swingable guide sleeve provided within the housing and connected with the plunger for imparting a swinging motion to the plunger, a plunger holding device comprising a cylindrical resilient member provided between the guide sleeve and the housing, the resilient member being in fluid-tight contact with the housing, wherein an end of the resilient member has bottom walls with an opening through which the plunger extends, the bottom walls being in fluidtight contact with the plunger.

2. In a saber saw including a housing, a plunger supported within the housing and being free to reciprocate, and a swingable guide sleeve provided within the housing and connected with the plunger for imparting a swinging motion to the plunger, a plunger holding device comprising a cylindrical resilient member provided between the guide sleeve and the housing, the resilient member being in fluid-tight contact with the housing, the plunger holding device further comprising a dustproof member provided between the plunger and a flange of the resilient member, and an O-ring provided on the flange for forcing the flange inward and thereby pressing the dustproof member against the plunger.

\* \* \* \* \*